United States Patent [19]

Prazak

[11] 4,025,303
[45] May 24, 1977

[54] DYESTUFF COMPOSITIONS CONTAINING MODIFIED SULFONATED LIGNIN DYE DISPERSANTS

[75] Inventor: Gerald Prazak, Charleston, S.C.

[73] Assignee: Westvaco Corporation, New York, N.Y.

[22] Filed: July 31, 1972

[21] Appl. No.: 276,424

[52] U.S. Cl. .......................................... 8/28; 8/34; 8/83
[51] Int. Cl.$^2$ .......................................... D06P 1/30
[58] Field of Search ....................... 8/83, 34, 37, 28

[56] References Cited

UNITED STATES PATENTS

| 1,426,522 | 1/1974 | Thiess | 8/28 |
| 2,680,113 | 6/1954 | Adler | 8/94.31 |
| 2,734,793 | 2/1956 | Marnon | 8/83 |

FOREIGN PATENTS OR APPLICATIONS

| 396,050 | 7/1933 | United Kingdom | 8/34 |

OTHER PUBLICATIONS

Fox, *Vat Dyestuffs & Vay Dyeing*, pp. 240, 241, pub. 1947, by John Wiley & Sons, N.Y.C.

Knecht, *Manual of Dyeing*, 9th Edition, p. 867, vol. II, Pub. 1945, Mapleton House, Brooklyn, N. Y.
*The Chemistry of Synthetic Dyes*, vol. II, K. Venkataraman, Academic Press, Inc., N.Y., 1952, pp. 872–873.
Kirk–Othmer Encyclopedia of Chemical Technology, vol. 7, Interscience Publishers, N.Y., 1965, pp. 556–557.
Chem. Abst. vol. 2, pp. 3403–3404.

*Primary Examiner*—Donald Levy
*Attorney, Agent, or Firm*—Richard L. Schmalz; Ernest B. Lipscomb, III

[57] ABSTRACT

Dyestuff composition for use in dyeing cotton fibers comprising a mixture of dye cakes of various colors, primarily direct or vat dyes, and sulfonated lignin dye dispersants having retarding properties. The dye dispersants of this invention are the reaction product of a sulfonated lignin and from 0.1 to 9.0% by weight of the total dispersant of a water-soluble magnesium salt, preferably 1.0 to 2.0% by weight. These dye dispersants are excellent dye retarders by eliminating uneven dyeing, and reduce foaming problems associated with dispersed vat dyes. These dye dispersants having retarding properties are used when a plurality of dye cakes are used in one dyeing operation to produce the much desired levelling effect on the process of vat dyeing.

3 Claims, No Drawings

DYESTUFF COMPOSITIONS CONTAINING MODIFIED SULFONATED LIGNIN DYE DISPERSANTS

BACKGROUND OF THE INVENTION

1. Field of the Invention

This invention relates to novel dyestuff compositions containing a plurality of dye cakes and a dispersant having retarding properties. More particularly, this invention relates to dyestuff compositions containing multi-dispersed dyes of various colors, in an aqueous solution, dispersed and retarded with the reaction product of a sulfonated lignin and a water-soluble salt.

2. The Prior Art

Many reactants have been used to modify the lignin by-product of woodpulping in order to formulate particular dyestuffs of certain characteristics needed in particular dyeing operations. By way of illustration, U.S. Pat. No. 3,505,243 to J. C. Steinberg et al. describes a sulfite lignin dispersant. U.S. Pat. No. 3,672,817 to S. I. Falkehag et al describes another modified sulfonated lignin dye dispersant. These patents cited show the state of the art, and are not intended to be all inclusive of lignin modifications as neither teach modification with magnesium sulfate.

Dyestuff compositions comprises, for the most part, a dye cake, i.e., disperse dyes or vat dyes, and a dispersant. There dyestuff compositions are widely used to color both synthetic and natural fibers. The various commercially available dye dispersants, that are used to disperse dye cake, vary widely depending upon the method of dyeing, the chemical composition of the cake, and the fabric being dyed. However, in general, various qualifications can be asserted for the dispersants in the dyestuff. In the dyestuff composition, the dispersant serves three basic functions.

1. It assists in reducing the dyestuff to a fine particle size.
2. It maintains the fine particle size in a dispersed medium.
3. It is used as an inexpensive diluent of the dye cake.

Generally, dye dispersants, used for dyestuff, have been of two major types, sulfonated lignins from the wood pulping industry via the sulfite or kraft processes, and sulfonated napthalene products from the petroleum industry. Both of these dispersant types have found applicaton in one or more areas of dye dispersion; however, each dispersant possesses one or more undesirable properties.

Disadvantages of certain of these dispersants, whether they are sulfonated lignins or sulfonated napthalene products, include uneven dyeing. Uneven dyeing is the result of one of the dyes in a multi-color dyestuff going into solution at a greater rate than the other color dye cakes. An economically feasible solution to the uneven dyeing phenomena has not been commercially available to the dyeing industry. Uneven dyeing can occur on cellulosic and ditrogenous fibers, such as cotton, nylon and wool, as well as polyester fibers. Various products have been offered by dry cake manufacturers and dispersant manufacturers as a result of the demands of the dye industry. However, to this date, none of the products have maintained stable reproducible results sufficient to remedy the ever prevalent uneven dyeing problem. It is this property where many dye dispersants begin to fail. Other disadvantages include poor heat stability, fiber staining, as well as fiber streaking, and a tendency to stabilize foams. While the first consideration is given to how effectively a product functions as dispersant, the second is given to stability of the dispersion under heat and pressure. Lastly, foam stabilization properties of dyestuff composition are troublesome for several reasons. First, in ball milling or grinding, in general, foam creates cleaning problems by frothing out of dispersion tanks and by building up foam within ball mills which generally slows the grinding process. Spray drying liquor with considerable foam causes a fluctuation of the temperature within the dryer. As many dyes are acutely sensitive to heat, this can cause deterioraton of these particular dyestuffs.

The advantages that the sulfonated lignin dye retarding dispersant of this invention possess over other dye dispersants include the ability to retard at least one of the dyes in a multi-color dyestuff composition to the extent necessary for levelling to be effecuated in the dye bath. Although the exact mechanism of the foresaid retarding action is not entirely understood, the results are readily reproducible with normal scientific accuracy in the vat dye industry. The resulting dyestuff, from the interaction of the dispersed dye cakes and the dispersant having retarding properties produces a level application of the dyes in the vat dyeing process. This levelling effect is the industry's terminology for the condition of the dye vat which produces an evenly dyed fabric, i.e., maintaining a constant shade of color at all points in the dyeing process when a mixture of two or more colors are being used to achieve a desired shade of color. Furthermore, it eliminates unevenly dyed fabric at the creases in the materials. The condition is much desired by the dyer for the accomplishment of a superior dye job. The condition is economically demanded of the industry due to the highly competitive field and low profit margin of the dye business. Another advantage of the retarding dispersants of this invention is that they have low foam stabilization properties, and render excellent dispersion qualities to the soluble dye cakes.

It is therefore, the general object of this invention to provide a dyestuff composition containing a selectively sulfonated lignin dye dispersant having retarding properties that are capable of providing the necessary levelling in a multi-color dye process. Furthermore, it is the object of this invention to satisfactorily disperse the dye, maintaining a superior antifoamingquality and overcoming to a large degree the objections of the prior art dyestuff compositions. Another object of the present invention is to provide a dyestuff composition containing a dispersant comprising a plurality of dyes and a dispersant which is the reaction product of a sulfonated lignin and a water-soluble magnesium salt.

Further objects, features and advantages of this invention will be evident from the following detailed description of the preferred embodiment.

SUMMARY OF THE INVENTION

It has been found that dyestuff compositions for use in dyeing cotton fibers may be made comprising a mixture of dye cakes of various colors, e.g., dispersed dyes and vat dyes, and up to 75% by weight of said dyestuff compositions of sulfonated lignin dye dispersants having retarding properties. The dye dispersants of this invention are the reaction product of a sulfonated lignin and from 0.1% to 9.0% by weight magnesium of the total dispersant of a water-soluble magnesium salt, preferably 1.0 to 2.0% by weight. The water-soluble salts of magnesium include, for example, magnesium sulfate, Epsom salt [$MgSO_4 \cdot 7H_2O$], magnesium chloride, magnesium borocitrate, magnesium formate, magnesium nitrate and magnesium acetate. These dye dispersants are excellent dye retarders, by eliminating uneven dyeing and reduce foaming problems associated with dispersed dyes. These dyes dispersants having retarding properties are used when a plurality of dye cakes are used in one dyeing operation to produce the much desired levelling effect on the process of vat dyeing.

DETAILED DESCRIPTION OF THE PREFERRED EMBODIMENT

There are two main ingredients included in the dyestuff composition of the preferred practice of this invention. They are the dyestuff, i.e., a dispersed vat dye, and the dispersant comprising the reaction product of a sulfonated lignin and water-soluble magnesium salt.

The dispersed vat dyes of this invention are insoluble in aqueous solution but are solubilized with sodium bisulfite or sodium hydrosulfite in alkaline media prior to the dyeing process and then oxidized on the fiber with oxidizing agents such as sodium perborate or hydrogen peroxide. A slight variation exists between the various dyes depending on their source. However, for the most part, the industry has established a world wide recognized standard and a general statement can be made to effect that the present invention will render satisfactory results using any of the commercially available disperse vat dyes.

The dispersants of this invention are modified lignins. The lignines which are modified to obtain the retarding properties of this invention are, in general, obtained from the kraft process liquor wherein the natural lignin is present as a sodium salt. Besides kraft lignin, other lignin starting materials may be employed such as residual liquor from pulping wood in an acid sulfite or bisulfite cook wherein the natural lignin in the wood is sulfonated during the pulping operation. For the purpose of this specification, sulfonated lignins will be referred to, but should be understood to include any of the hereinabove mentioned starting materials. In kraft pulping the wood is subjected to the effects of strong alkali. The lignin in this process forms a soluble sodium salt which is separated from fthe cellulose by controlled acidification of the liquors containing the lignin salt, pure lignin is received. This lignin is subsequently selectively sulfonated to produce the desired sulfonated lignins.

The first step in developing the dispersant is to properly sulfonate the lignin. The criteria for this step being the particular solubility requirements of the dispersed vat dye cake and/or cakes. By the term "sulfonated lignin", it is meant any lignin containing at least an effective amount of sulfonate groups to give water solubility in neutral pH solutions. Although each dyer has his own particular requirements for a sulfonated lignin, a highly sulfonated lignin is the most preferred lignin for most processes. It should be noted that the degree of sulfonation of a lignin is proportional to the solubility of that lignin in an aqueous solution.

The degree of sulfonation present in the lignin is a controlling factor in making the modified dye retarding dispersant. Of course, there exists a direct correlation between the retarding effect and the levelling effect. Essentially the retarding effect on the dye cakes' dissolution into the diluent has a levelling effect on the vat dyestuff. The quality with which this invention deals with in the main is the levelling effect on the dye bath. The solubility of the lignin in the aqueous solution is a more intimate relationship to the existence of the levelling status of the dye bath.

The sulfonated lignin is reacted with a water-soluble magnesium salt in an amount of 0.1 to 9.0% of magnesium by total weight of the dispersant. At an addition level below 0.1% of magnesium the dispersant does not have sufficient retarding properties; whereas, above 9.0% by total weight of the dispersant of magnesium the disperse vat dye is completely retarded. The preferred addition of magnesium to lignin is 1.0 to 2.0% for most disperse vat dyes. The water-soluble salts of magnesium include, for example, magnesium sulfate. Epsom salt [$MgSO_4 \cdot 7H_2O$], magnesium chloride, magnesium borocitrate, magnesium formate, magnesium nitrate, and magnesium acetate, with Epsom salt being preferred. The magnesium salts used in this invention is the commercial or laboratory grade magnesium salt in crystalline form. However, the powder form or even an aqueous solution of magnesium salt will suffice provided the concentration of the latter is sufficiently great so as not to dilute the dye bath composition beyond required process specifications.

In a preferred practice of this invention, the sulfonated lignin is maintained at a constant temperature between ambient and 150° F., preferably 80° F., and a pressure of one atmosphere, and the desired weight percent of magnesium salt is brought into contact with the sulfonated lignin. The combination is thoroughly mixed until all solid magnesium salt has been dissolved into the solution. It should be pointed out that the sulfonated lignin per se plays an important part in the ease of release of magnesium to retard one more of the dyes. As the degrees of sulfonation increases the better the sulfonated lignin acts in obtaining an equilibrium in presenting the magnesium ion into the dye bath.

The resulting sulfonated lignin magnesium salt treated dispersant is then either combined with the desired multicolor disperse vat dyes or added to the dye solution in an amount of dispersant on fabric or fiber is generally in the range of about 2.0% weight of fiber. Retarding of the dissolution rate of the milti-colored disperse dye cakes is now effectuated in the vat dye application. This end result produces a superiorly dispersed dye and exceedingly level dyestuff. Fabric or fiber dyed in this dyestuff will have an even color on its face as well as at the innerface creases.

The practice of this invention may be seen in the following example.

EXAMPLE

This example illustrates the make-up of some of the dye dispersants having retarding properties of this invention. To several alkali lignins having varying degrees of sulfonation, magnesium sulfate [Epsom Salts] were added at different levels and allowed to react while mixing. The pH was between 10-11 for each reaction and the lignin dispersant and magnesium salt remained in solution. The modified dispersants are shown in the table below.

| Lignin | Moles of Sulfonation/ 1000 grams of Lignin | % Mg on Total Weight |
|---|---|---|
| REAX 88B[1] | 4 | none |
| REAX "Magnesium"[2] | 1 | 9.0 |
| Lignin A | 1 | 1.0 |
| Lignin A | 1 | 2.0 |
| Lignin B | 2 | 1.0 |
| Lignin B | 2 | 2.0 |
| Lignin C | 4 | 1.05 |
| Lignin C | 4 | 2.0 |

Notes:
[1]REAX 88B is a sulfonated kraft lignin dye dispersant sold by Westvaco Corporation.
[2]REAX Magnesium is magnesium chelated to a sulfonated kraft lignin.

The modified lignin dispersants were tested for their retarding ability in a multi-color vat dyeing system. The dye system includes Vat Orange 2 (C.I. 59705) and Vat Brown 12. The modified dispersant was added to cotton fibers at a level of 2% by weight of fibers. The results were visually observed. The REAX "Magnesium" had too high a concentration of magnesium and completed retard one of the dyes. The REAX 88 alone failed to retard at all and the fabric failed to have the desired shade due to one or more of the colors dyeing more rapidly than the rest of the dyestuffs present in the bath. The other dispersants showed the desired retarding properties at various degrees of desirability with Lignin C at 2% by weight magnesium being the best.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:
1. A dyestuff composition comprising,
   a. a plurality of disperse vat dyes, and
   b. up to 75% by weight of said dyestuff composition of a dispersant effective as a dye leveler comprising the reaction product of a sulfonated lignin and 0.1% to 90% by weight of magnesium ion from a water-soluble magnesium salt, said reaction product being effective to level at least one of said disperse vat dyes.
2. The dyestuff composition of claim 1 wherein said reaction product contains 1 to 2% by weight of magnesium.
3. The dyestuff composition of claim 1 wherein said magnesium salt is Epsom Salts.

* * * * *

UNITED STATES PATENT OFFICE
CERTIFICATE OF CORRECTION

Patent No. 4,025,303      Dated May 24, 1977

Inventor(s) Gerald Prazak

It is certified that error appears in the above-identified patent and that said Letters Patent are hereby corrected as shown below:

Column 1, line 43, "dyestuff" should read --dyestuffs--.

Column 1, line 59, "ditrogenous" should read --nitrogenous--.

Column 2, line 3, after "as" insert --a--.

Column 2, line 48, "antifoamingquality" should read --antifoaming quality--.

Column 3, line 34, "lignines" should read --lignins--.

Column 3, line 47, "fthe" should read --the--.

Column 4, line 39, "degrees" should read --degree--.

Column 4, line 62, in the Example, "degrees" should read --degree--.

UNITED STATES PATENT OFFICE
CERTIFICATE OF CORRECTION

Patent No. 4,025,303    Dated May 24, 1977

Inventor(s) Gerald Prazak

It is certified that error appears in the above-identified patent and that said Letters Patent are hereby corrected as shown below:

Column 6, line 14, in the Claims, "a plurality of disperse vat dyes," should read --a mixture of vat dyes, which mixture does not level,--.

Column 6, line 17, in the Claims, after "sulfonated" insert --kraft--.

Column 6, line 18, in the Claims, "90%" should read --9.0%--.

Signed and Sealed this thirtieth Day of August 1977

[SEAL]

Attest:

RUTH C. MASON
*Attesting Officer*

C. MARSHALL DANN
*Commissioner of Patents and Trademarks*